No. 727,152. PATENTED MAY 5, 1903.
P. L. KIMBALL.
NUT LOCK.
APPLICATION FILED NOV. 7, 1901.
NO MODEL.

Witnesses
Inventor
Purley L. Kimball
Attorneys

No. 727,152. Patented May 5, 1903.

UNITED STATES PATENT OFFICE.

PERLEY L. KIMBALL, OF BELLOWS FALLS, VERMONT, ASSIGNOR TO VERMONT FARM MACHINE COMPANY, OF BELLOWS FALLS, VERMONT, A CORPORATION OF VERMONT.

NUT-LOCK.

SPECIFICATION forming part of Letters Patent No. 727,152, dated May 5, 1903.

Application filed November 7, 1901. Serial No. 81,452. (No model.)

*To all whom it may concern:*

Be it known that I, PERLEY L. KIMBALL, a citizen of the United States, and a resident of Bellows Falls, in the county of Windham and State of Vermont, have invented certain new and useful Improvements in Devices in the Nature of Nut-Locks, of which the following is a full, clear, and exact description, whereby any one skilled in the art may make and use the same.

The object of my invention is to produce a device of the class specified having features of novelty and advantage which is particularly adaptable for use in connection with the bearings of centrifugal separators.

I have shown my invention as applied to the bearings of a centrifugal separator.

Figure 1:
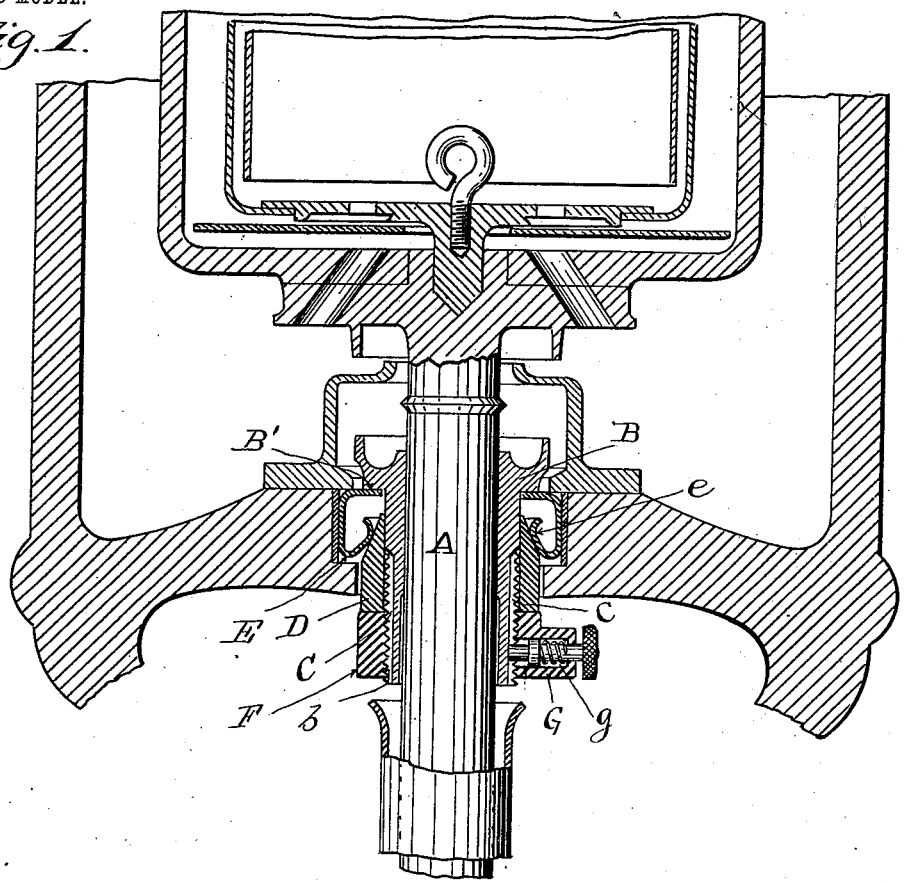
Figure 2:
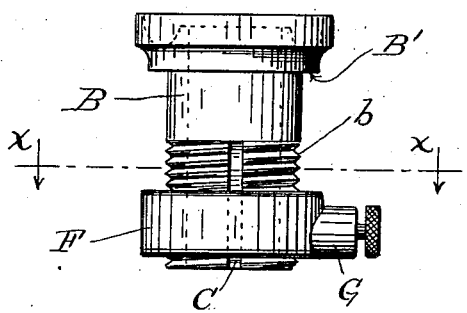
Figure 3:
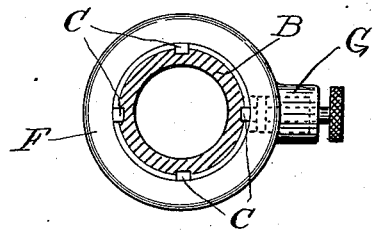

In the drawings, Figure 1 represents a view in central vertical section of the separator-bearing and the nut used in connection therewith. Fig. 2 is a side elevation of the threaded neck-bearing and the device thereon. Fig. 3 is a section on the line *x x* of Fig. 2.

In the drawings the letter A denotes the spindle, which carries the separator-bowl, and B denotes what is called the "neck-bearing." It will be noted that at the top the neck-bearing is enlarged, forming a shoulder B'. In the frame of the machine is a recess in which is located a cup-shaped and recurved spring E. It will be seen from Fig. 1 that the upper part of this spring supports the neck-bearing vertically. The lower part of the spring is curved inwardly or "recurved," as at *e*. The neck-bearing B is exteriorly threaded at its lower end, as indicated at *b*, and has grooves C extending throughout the length of the threads crosswise thereof. Sliding on the outside of this neck-bearing is a sleeve D, of conical shape at its upper end, this conical end extending into the opening formed by the recurved part of the spring.

In machines of this class which revolve at high rates of speed it is not practicable to have a perfectly rigid bearing for reasons which are clearly apparent. By the structure above described the neck-bearing for the spindle is supported on a spring, and by forcing the conical part of the sleeve D upward into the recurved part of the spring the compression of the spring is increased and the support for the neck-bearing more nearly approaches rigidity—that is to say, that while at all times this bearing is capable of slight vibration or yielding movement the adjustment of the compression of the spring by means of the sleeve D permits of maintaining the bearing more or less rigid, as desired. Heretofore it has been customary to adjust and maintain the position of this sleeve D by means of two nuts operated by wrenches. The adjustment very often has to be fixed while the machine is running, and this has been very difficult to accomplish heretofore. The device shown in the drawings by which I accomplish the desired result consists of a ring F, which may be either round or polygonal in shape, threaded to fit the threads on the neck-bearing B. Projecting from the periphery of this ring is a hub G, recessed at *g*. In the recess is located a plunger or pawl having a handle at its outer end, the plunger or pawl being spring-actuated inwardly, the inner end of the plunger or pawl being adapted to engage the grooves in the neck-bearing B to hold the nut or ring in position. When an adjustment of the bearing is desired, the plunger or pawl is simply redrawn from the grooves against the spring and the ring turned as much as desired or until the plunger or pawl engages another of the grooves under the influence of the spring, thus locking the nut in position.

I claim as my invention—

In combination, the rotary shaft, the hollow cylinder exteriorly screw-threaded and longitudinally slotted, the cup-shaped recurved spring adapted to support the hollow cylinder both vertically and laterally, the wedge-shaped sleeve entered between said spring and said cylinder, the nut bearing against the lower end of said wedge-shaped sleeve, the recessed hub on said nut, the pawl located in said hub and extending through the wall of the nut movable radially and spring-pressed inwardly, and the operating-handle for said pawl, substantially as described and for the purposes set forth.

PERLEY L. KIMBALL.

Witnesses:
F. C. HILDRETH,
LEON J. BALL.